United States Patent [19]

Stevens

[11] Patent Number: 4,867,245
[45] Date of Patent: Sep. 19, 1989

[54] WING FOLD IMPLEMENT WITH LATCHING STRUCTURE

[75] Inventor: Phillip E. Stevens, Ankeny, Iowa

[73] Assignee: Deere & Company, Moline, Ill.

[21] Appl. No.: 322,068

[22] Filed: Aug. 15, 1988

[51] Int. Cl.[4] .............................................. A01B 73/00
[52] U.S. Cl. .................................. 172/311; 172/466; 172/776
[58] Field of Search ............... 172/311, 776, 662, 456, 172/457, 466, 494, 481, 310; 56/228, 385

[56] References Cited

U.S. PATENT DOCUMENTS

| | | | |
|---|---|---|---|
| 3,321,028 | 5/1967 | Groenke | 172/456 X |
| 3,948,327 | 4/1976 | Parker et al. | 172/311 |
| 3,967,684 | 7/1976 | Haverdink | 172/311 |
| 4,133,391 | 1/1979 | Richardson et al. | 172/311 |
| 4,178,998 | 12/1979 | Rockwell | 172/311 |
| 4,204,575 | 5/1980 | Richardson et al. | 172/311 |
| 4,206,816 | 6/1980 | Richardson et al. | 172/311 |
| 4,529,043 | 7/1985 | Jensen et al. | 172/776 |
| 4,615,397 | 10/1986 | Hastings | 172/311 X |
| 4,619,330 | 10/1986 | Machnee | 172/457 X |
| 4,660,654 | 4/1987 | Wiebe et al. | 172/311 X |

Primary Examiner—Richard J. Johnson
Assistant Examiner—Jeffrey L. Thompson

[57] ABSTRACT

An agricultural implement with a main frame and inner and outer wing frames that include gravity actuated latching structure securing the wing frames in a folded position. The latching structure automatically locks the wing frames together as they are pivoted upwardly in the folded position toward a transport position and unlocks the wing frames as they are pivoted downwardly toward a transport position.

7 Claims, 4 Drawing Sheets

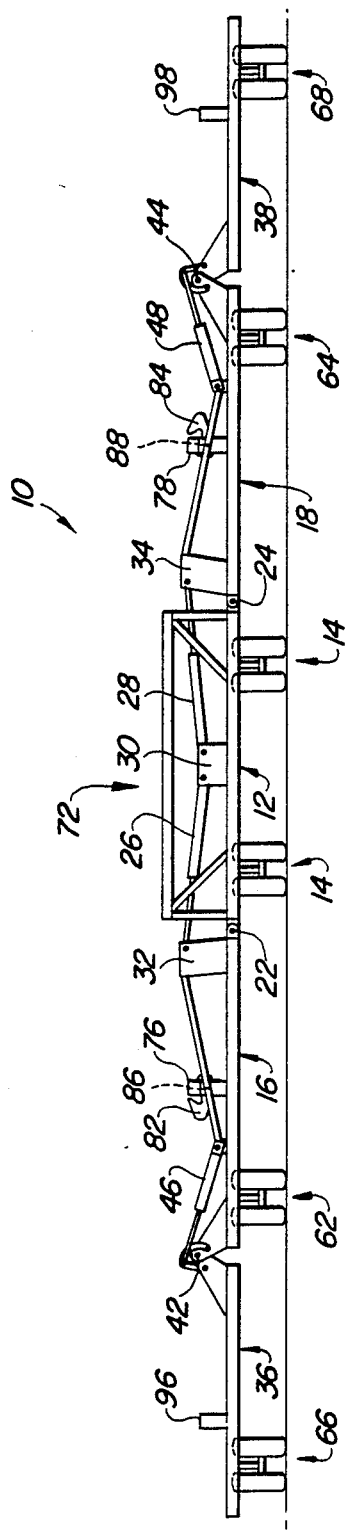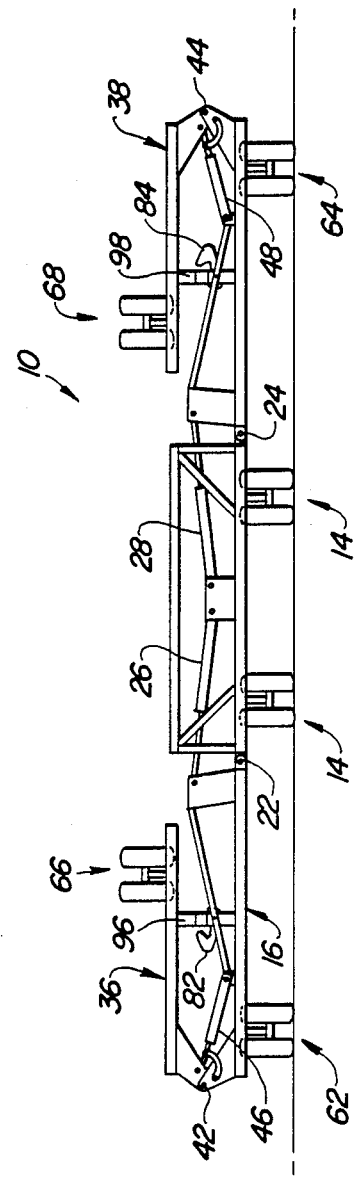

WING FOLD IMPLEMENT WITH LATCHING STRUCTURE

BACKGROUND OF THE INVENTION

The present invention relates generally to agricultural implements having a plurality of wing sections which are foldable between field-working and transport positions, and more specifically, to an implement having foldable inner and outer wing sections and latching structure for securing the wing sections together as they are moved between the field-working and transport positions.

Multi-sectioned implements which are foldable to reduce implement width for transport have become increasingly popular. Implements such as exemplified in U.S. Pat. Nos. 3,948,327 and 3,967,684, of common ownership with the present invention, include a horizontally disposed main frame section pivotally supporting an inner wing frame for rocking between an outwardly extending field-working position and an upwardly extended transport position. An outer wing frame is pivotally connected to the outer end of the inner wing frame for rocking approximately 180 degrees between an outwardly extended unfolded position and a folded position generally alongside the wing frame. The outer wing frame is first folded over the inner wing frame, and then the inner wing frame is rocked upwardly to the transport position. During transport, it is necessary to keep the outer wing generally parallel to the inner wing so that structure such as walking beam wheels which extend inwardly from each of the outer wing frames in the transport position do not strike each other as the implement moves over the ground. To lock the outer wing frames with respect to the inner wing frames without additional hydraulic circuitry or expensive latching mechanisms usually requires that the operator leave the tractor and insert pins or other securing structure. This can be timeconsuming and inconvenient for the operator.

It is therefore an object of the present invention to provide an improved multi-sectioned folding implement with structure for locking the wing frames in position during transport. It is a further object to provide such an implement having an improved latching system which is simple in construction and operation.

It is a further object of the invention to provide a multi-section folding implement having inner and outer wing frames wherein the wing frames are latched together automatically as the frames are rocked to the transport position without the operator having to leave the tractor to pin or unpin latching devices. It is another object of the invention to provide such a structure which is relatively simple and inexpensive in construction and yet which effectively secures the wings in position. It is a further object to provide such a structure which automatically unlatches as the wing frames are rocked toward the field-working positions.

It is still another object of the present invention to provide a multi-sectioned folding implement having inner and outer wing frames located at opposite ends of a main frame section and including latching structure for automatically latching the outer wing frame to the inner wing frame on each side of the implement as the inner wing frame is rocked upwardly toward the transport position to prevent interference between the outer wing frames during transport. It is a further object to provide such a structure which unlocks the wing frames automatically as the inner wing frames are rocked back toward the field-working position. It is a further object to provide such a structure wherein latching and unlatching of the wing frames is accomplished automatically as the inner wing frames are rocked with respect to the main frame. It is still another object to provide such a structure wherein the latching mechanism is biased by gravity without need for additional hydraulic circuitry or other complicated structure.

In accordance with the above objects, an implement constructed according to the present invention includes a pair of inner wing frames pivotally connected to the outer ends of a main frame, and outer wing frames pivotally connected to the outer ends of the inner wing frames. The outer wing frames are foldable approximately 180 degrees from outwardly unfolded positions to positions generally overlying the inner wing frames. After the outer wing frames are folded, the inner wing frames are rocked upwardly toward a generally upright but slightly over center transport position. To prevent the outer wing frames from rocking with respect to the inner wing frames during transport, latching structure for securing the outer wing frames in generally parallel relationship with respect to the inner wing frames is provided. The latching structure includes a gravity-activated latch pivotally connected to a bracket on the inner wing frame, and a bracket on the outer wing frame which contacts the inner wing frame bracket. The latch has a hooked portion and a center of gravity which shifts relative to the pivotal axis to cause the latch to automatically gravitate to a locking position wherein the hooked portion moves over the outer wing bracket as the inner wing frame rocks toward the upright position. The latch maintains the inner and outer wing frames generally in parallel relationship during transport to prevent interference between the outer wing frames and the wheel assemblies projecting therefrom during transport. As the inner wing frame is rocked back toward the field-working position, the center of gravity of the latch changes relative to the pivotal axis of the latch to automatically cause the latch to fall away from the outer wing frame bracket, thereby releasing the outer wing frame relative to the inner wing frame for unfolding toward the field-working position. Therefore, the latching and unlatching of the wings is accomplished without the operator leaving the tractor to pin or unpin any latching devices or the like. The gravity-actuated latch arrangement is relatively simple and effective, and provides automatic locking and unlocking of the wing frames.

These and other objects, features and advantages of the present invention will become apparent to those skilled in the art from the description which follows and from the drawings.

BRIEF DESCRIPTION OF THE DRAWINGS

FIG. 2 is a rear elevation of the implement of FIG. 1 in the unfolded field-working position.

FIG. 3 is a view similar to FIG. 2 but showing the implement with the outer wing frames folded over the inner wing frames.

DESCRIPTION OF THE PREFERRED EMBODIMENT

Figure 1:
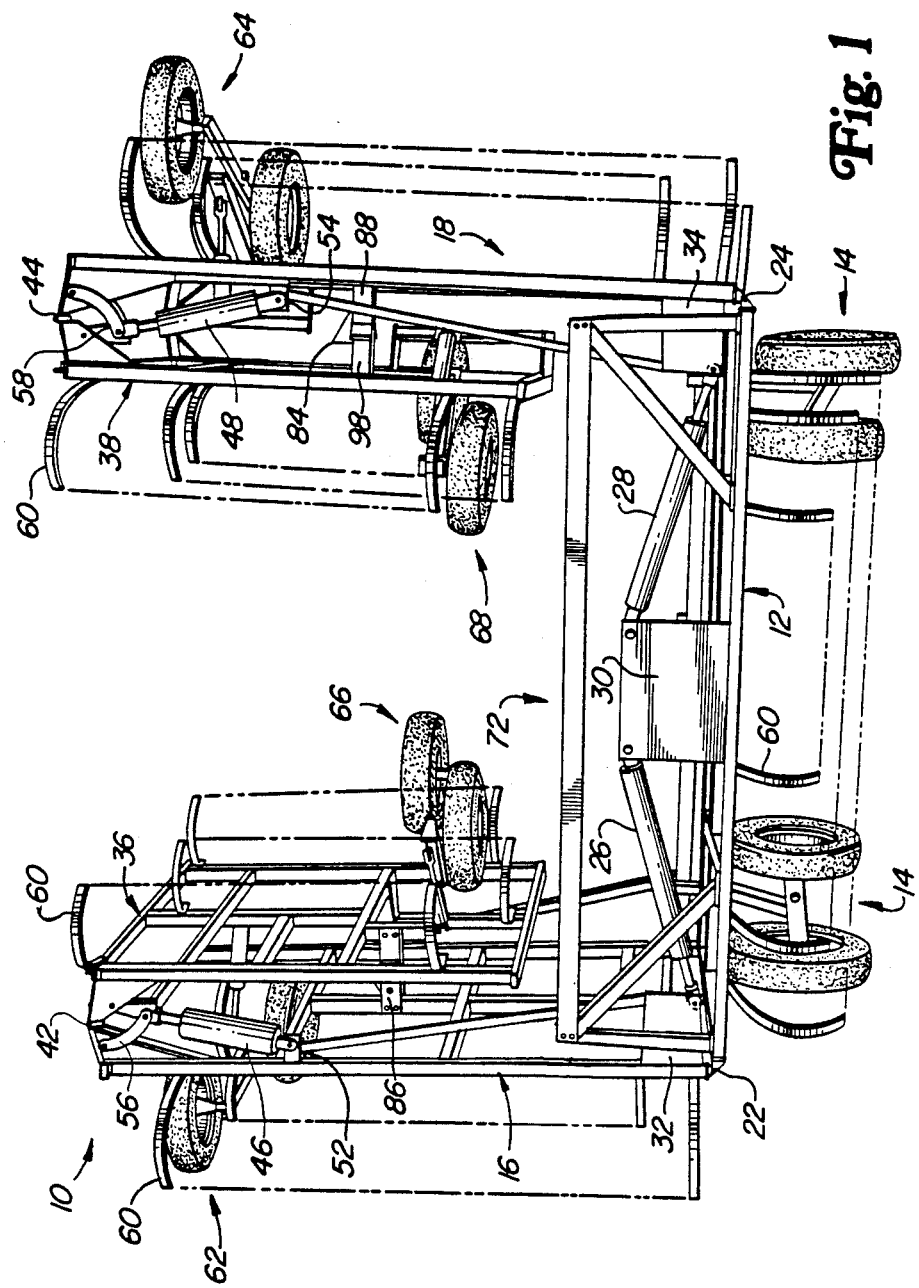
FIG. 1 is a rear perspective view of a multi-sectioned implement constructed in accordance with the teachings of the present invention with the wing frames approaching the transport position.

Referring to FIG. 1, there is shown a multi-sectioned agricultural implement 10. As shown, the implement 10 is a five-sectioned folding field cultivator having a main frame section 12 supported by ground wheel assemblies 14 for forward movement over the soil. Pivotally connected to the outer ends of the main frame section 12 are left and right inner wing frames 16 and 18. The frames 16 and 18 are rockably connected to the main frame section 12 by hinge structures 22 and 24, respectively, for rocking about generally fore-and-aft extending pivotal axes. Hydraulically actuated folding cylinders 26 and 28 are connected between a main bracket 30 on the frame section 12 and brackets 32 and 34 located on the inner wing frames 16 and 18, respectively.

Outer wing frames 36 and 38 are pivotally connected to the inner wing frames 16 and 18, respectively, by vertically offset hinge structures 42 and 44 for rocking about generally fore-and-aft extending axes. Hydraulic wing folding cylinders 46 and 48 are connected between brackets 52 and 54 on the respective inner wing frames 16 and 18 and linkages 56 and 58 which are pivotally connected to the hinge structures 42 and 44.

Earthworking tools 60 are connected to the frames 12, 16, 18, 36 and 38. The wing frames 16 and 18 support ground-engaging wheel assemblies 62 and 64, and the outer wing frames 36 and 38 support ground engaging wheel assemblies 66 and 68, respectively.

Brace structure 72 is connected to and extends upwardly from the main frame section 12. Inner brackets 76 and 78 (FIG. 2) extend upwardly from the inner wing frames 16 and 18, respectively, and pivotally support hook-like latches 82 and 84 for rocking about generally fore-and-aft extending pivotal axes 86 and 88, respectively.

Outer brackets 96 and 98 are connected to and extend upwardly from the outer wing frames 36 and 38 (FIG. 2) and are adapted to be received by the corresponding brackets 76 and 78 on the inner wing frames 16 and 18. As will be described in detail below, the latches 82 and 84 gravitate to a locking position (FIG. 6) as the folded inner wing frame, outer wing frame pairs 16, 36 and 18, 38 are rocked upwardly toward the transport position. As the folded pairs are rocked downwardly from the transport position, the latches 82 and 84 will gravitate to the unlocked position (FIG. 3) to permit the outer wing frames 36 and 38 to be unfolded to the field-working positions (FIG. 2).

Figure 5:
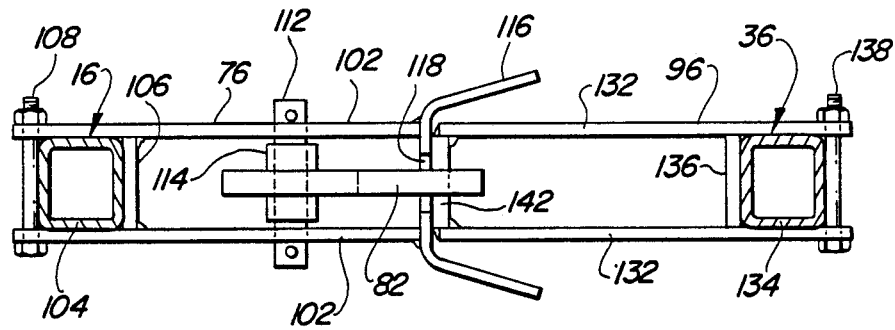
FIG. 5 is a side view of the mechanism of FIG. 4.
Figure 4:
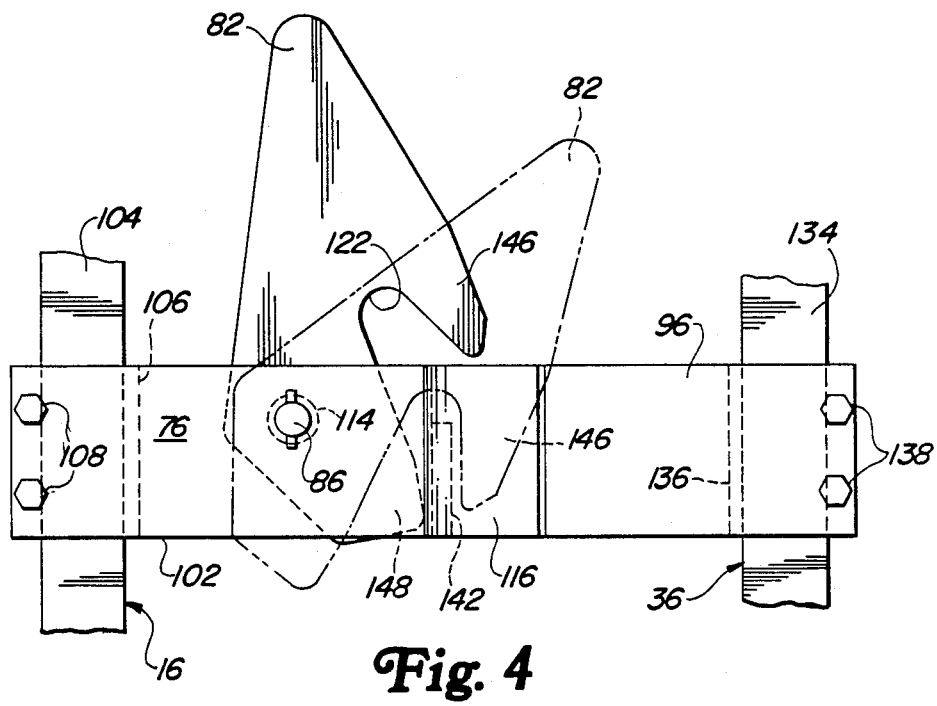
FIG. 4 is a rear view of the latching mechanism utilized in the implement of FIG. 1 to lock the inner and outer wing frames.

The latching arrangement including the latch 84 for the left-hand side of the implement 10 is generally the mirror image of that for the right-hand side, and therefore only the structure associated with the latch 82 will be described in detail here. Referring to FIGS. 4 and 5, the inner bracket 76 includes a pair of spaced side plates 102 located on either side of a rectangular beam 104 forming a portion of the frame 16. A connecting member 106 is welded between the plates 102 and abuts against the top surface of the beam 104. Bolts 108 extend through the plates 102 below the beam 104 to secure the bracket 76 in position.

The pivotal axis 86 of the latch 82 is defined by a pin 112 passing through the side plates and rotatably mounting a collar 114 on which is secured the latch 82. A channel-shaped guide member 116 opens toward the corresponding outer bracket 96 when the inner and outer wing frames 16 and 36 are in the folded position. The bight portion of the member 116 is welded to the plates 102 and is notched at 118 to receive a notch 122 located in the latch 82.

With the execution of the outer end, the bracket 96 is constructed similarly to the bracket 76 and includes a pair of plates 132 spaced on opposite sides of a tubular beam 134 which forms a portion of the outer wing frame 36. The plates 132 are spaced by a connecting member 136 which abuts against one surface of the tube 134. The bracket 96 is secured to the beam 134 by bolts 138 extending through the plates 132. A stop pad 142 is welded between and extends outwardly from the ends of the plates 132 and is adapted to be received against the bottom of the bight portion of the guide member 116 when the outer wing frame 36 is folded over the inner wing frame 16 (FIG. 3).

Figure 6:
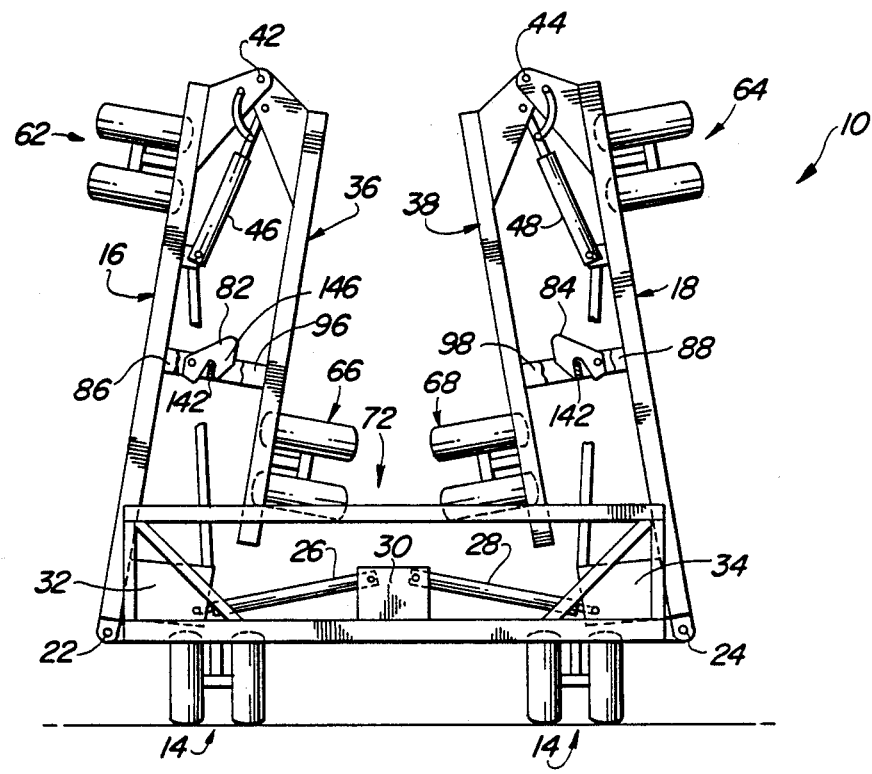
FIG. 6 is a rear view of the implement in the transport position with portions broken away to better show the latching mechanisms.

The latch 82 includes a hook-like portion 146 which extends around the stop pad 142 when the latch is rotated in the clockwise direction to the locked position (FIGS. 4 and 6). The latch 82 also includes an extension member 148 located on the opposite side of the pivot 86 from the hook-like portion 146 for engaging the member 116 to prevent the latch 82 from rotating in the counterclockwise direction beyond a preselected unlocking position. The portion of the latch 82 on the opposite side of the pivot 86 extends outwardly a substantial distance beyond the hook-like portion 146 to add weight to the latch 82 and to extend the center of gravity of the latch outwardly from the pivot so that the latch 82 will gravitate to the unlocked position as shown in FIGS. 2 and 3 when the inner wing frame 16 is rotated downwardly from the transport position of FIGS. 1 and 6. As the wing frame 16 is rotated upwardly toward the transport position, the center of gravity of the latch 82 shifts relative to the pivot 86 to cause the latch to gravitate toward the locked position with the notch 122 received over the stop pad 142 to firmly secure the outer wing frame 36 in a position generally parallel to the inner wing frame 16 (FIG. 6) even as the inner wing frame is rotated over the center vertical position. This prevents the wheels 66 or other structure extending from the outer wing frame 36 from interfering with the structure which extends inwardly from the opposite outer wing structure 38. The latches 82 and 84 are counterbalanced such that they will gravitate toward the locked position as the wing frames approach the vertical attitude. Upon rocking the wing frames from the transport position towards the field-working position, the center of gravity of the latches will shift relative to their pivots to cause the latches to rotate away from the locked positions so that thereafter the outer wing frames 36 and 38 may be rotated from the parallel folded positions as shown in FIG. 3 to the field-working positions as shown in FIG. 2 without need for the operator to leave the seat of his tractor. The latches 82 and 84 firmly secure the stop pads 142 against the respective guide members 116. The guide members 116 help to channel the ends of the brackets 96 to the proper location as the outer wing frames are folded over the inner wing frames.

In operation, assuming that the implement 10 is in the field-working position shown in FIG. 2, the operator actuates the hydraulic cylinders 46 and 48 to retract the cylinders and lift the outer wing frames 36 and 38 over the inner wing frames 16 and 18 to the position shown in FIG. 3 with the stop pads 142 on the brackets 96 and 98 bottoming against the guide members 116 on the brackets 76 and 78, respectively. The cylinders 26 and 28 are then retracted to pivot the folded inner and outer wing frame pairs 16, 36 and 18, 38 upwardly about the hinge structure 22 and 24. As the folded wing frames approach the vertical position, the latches 82 and 84 gravitate toward the stop pads 142 on the brackets 96 and 98 to lock the frame pairs 16, 36 and 18, 38 in generally parallel relationship. Continued retraction of the cylinders 26 and 28 rocks the folded outer wing frames over-center toward an inwardly directed transport position (FIG. 6) with the latches 82 and 84 preventing interference between the structures extending inwardly from the outer wing frames 36 and 38.

To prepare the implement for the field-working operation, the operator extends the cylinders 26 and 28 to rock the wing frame pairs downwardly about the hinge structures 22 and 24. As the wing frame pairs move over a center vertical position toward the position shown in FIG. 3, the centers of gravity of the latches 82 and 84 shift with respect to their respective pivots to cause the latches to gravitate to the unlocked position as shown in FIG. 3. When the inner wing frames 16 and 18 reach the outwardly extended position shown in FIG. 3, the cylinders 46 and 48 are extended to rock the outer wing frames 36 and 38 about the hinge structure 42 and 44, respectively, to the field-working position shown in FIG. 2.

Having described the preferred embodiment, it will be apparent that modifications can be made without departing from the scope of the invention as defined in the accompanying claims.

I claim:

1. A multi-sectioned folding implement including a horizontally disposed main frame section having opposed outer ends;
    an inner wing frame having first and second ends and pivotally connected at its first end to an outer end of the main frame section for rocking between a horizontally disposed fieldworking position and an upright transport position wherein the second end is raised above the main frame;
    an outer wing frame pivotally connected to the second end of the inner wing frame for rocking between an extended position extending outwardly from the inner wing frame and a generally horizontal folded position over the inner wing frame;
    a first hydraulic cylinder connected between the inner and outer wing frames for rocking the outer wing frame to the horizontal folded position;
    first and second brackets connected to and extending upwardly from the inner and outer wing frames, respectively, when the wing frames are in the field-working position, said brackets including matingly engageable contact areas for preventing further folding of the outer wing frame relative to the inner wing frame beyond the horizontal folded position;
    a second hydraulic cylinder and means connecting the second cylinder between the main frame section and the inner wing frame for rocking the inner wing frame, with the outer wing frame in the folded position over the inner wing frame, to the upright transport position; and
    means for securing the outer wing frame relative to the inner wing frame in the preselected folded position as the inner and outer wing frames approach the upright transport position, said means for securing including a gravity actuated latch connected to a one of the first and second brackets and automatically movable into engagement with the other of the brackets as the inner wing frame moves toward the transport position with the outer wing frame in the folded position.

2. The invention as set forth in claim 1 wherein the latch includes counterbalance means for automatically moving the latch out of engagement with said other of the brackets as the inner wing frame moves away from the transport position.

3. The invention as set forth in claim 1 wherein the latch is freely pivotally connected to the first bracket for rocking between latching and unlatching positions about an axis, the latch having a center of gravity offset from the latch axis for biasing the latch toward the latching position as the inner wing frame moves to the transport position.

4. The invention as set forth in claim 3 including means supporting the latch from the first bracket of the center of gravity of the latch relative to the pivotal axis of the latch as the inner wing frame rocks away from the transport position to automatically bias the latch toward the unlatching position.

5. The invention as set forth in claim 3 wherein the latch includes a hook-like member and the second bracket includes hook-receiving structure, the center of gravity of the latch shifting relative to the latch axis as the inner wing frame rocks to cause the hook-like member to rock into engagement with the hook-receiving structure as the inner wing frame approaches the transport position.

6. The invention as set forth in claim 5 wherein the center of gravity of the latch shifts relative to the latch axis as the inner wing frame rocks toward the field-working position thereby biasing the hook-like member out of engagement with the hook-receiving structure.

7. The invention as set forth in claim 1 wherein the inner wing frame is foldable to an over-center position beyond a vertical position and the latch is activated prior to the inner frame rocking beyond the vertical position.

* * * * *